United States Patent [19]

Galloway

[11] 4,354,594

[45] Oct. 19, 1982

[54] FLEXIBLE CONVEYOR SYSTEM

[76] Inventor: Robert C. Galloway, 1449 Parkhurst St., Simi Valley, Calif. 93065

[21] Appl. No.: 163,914

[22] Filed: Jun. 27, 1980

Related U.S. Application Data

[63] Continuation of Ser. No. 929,521, Jul. 31, 1978, abandoned.

[51] Int. Cl.³ .................... B65G 25/00; B65G 37/00
[52] U.S. Cl. ............................. 198/743; 198/473
[58] Field of Search ................. 198/472, 473, 743; 104/162

[56] References Cited

U.S. PATENT DOCUMENTS

| 1,167,216 | 1/1916 | Rathsfeld | 198/473 |
| 2,381,185 | 8/1945 | Rogers et al. | 198/743 |
| 2,449,669 | 9/1948 | Pollers | 198/727 |
| 2,536,575 | 1/1951 | Seldin | 198/473 |
| 2,627,968 | 2/1953 | Thompson | 198/472 |
| 2,788,885 | 4/1957 | Begent | 198/743 |

Primary Examiner—John J. Love
Assistant Examiner—Brian Bond
Attorney, Agent, or Firm—William W. Glenny; Alan Conrad Rose

[57] ABSTRACT

A conveyor system for moving hangers carrying clothes includes a reciprocating chain which has a number of depending fingers attached to it at regular intervals along its length. The fingers extend down and move hangers along a pipe which is mounted below the chain. As the chain is reciprocated back and forth, each of the fingers picks up a hanger and moves it forward along the pipe, and then on the backward movement in the reciprocating motion of the chain, each of the fingers slides over the hook of the hanger and moves back to pick up the next preceding hanger. The fingers are pivotally suspended from a series of plastic slides, and these slides are arranged so that they may be pushed into engagement with one another, at one end of the assembly, so that the pipe on which the clothes hangers are supported may be used for general purpose storage and the hangers may be slid in either direction on this pipe. The fingers and plastic slides for the fingers are arranged to have sufficient resiliency and play so that if a hanger should become stuck in position the fingers will pop up and over the stuck hangers and not damage the mechanism. In addition, release camming action may be provided to raise the fingers away from the pipe or tubing which supports the hangers, thereby providing an alternative way of permitting general purpose usage of the pipe support.

1 Claim, 11 Drawing Figures

U.S. Patent  Oct. 19, 1982  Sheet 1 of 3  4,354,594
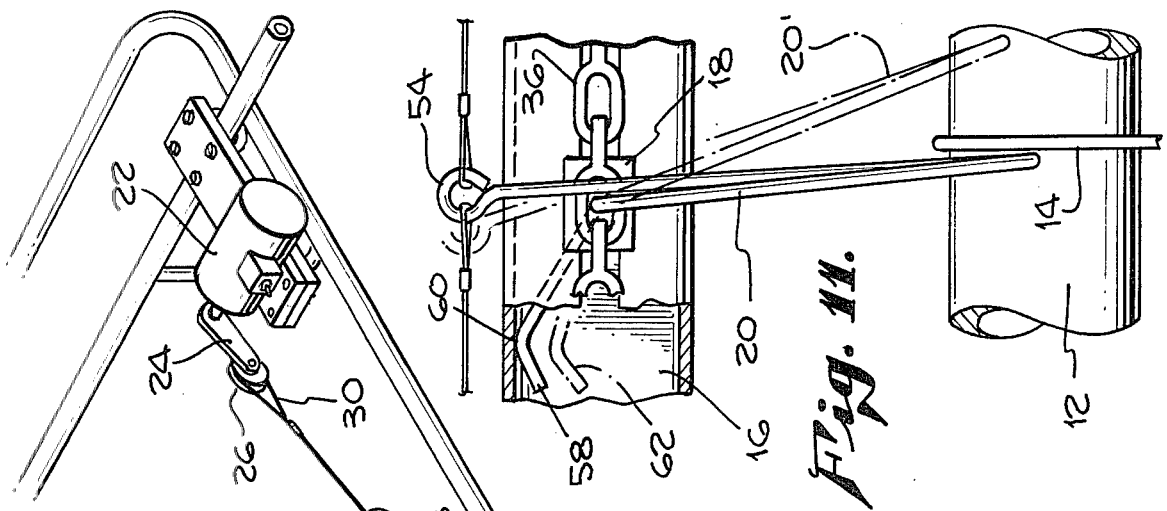
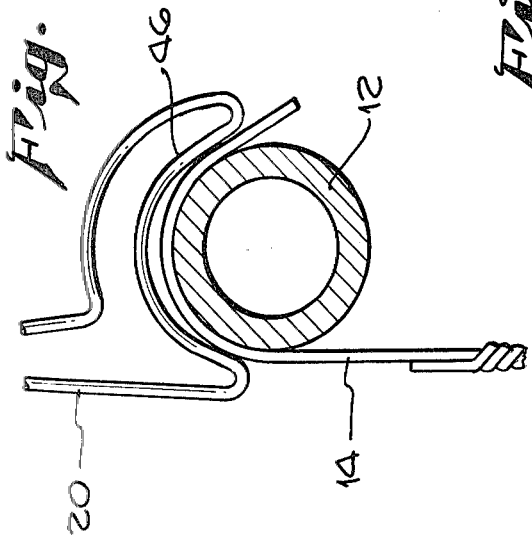
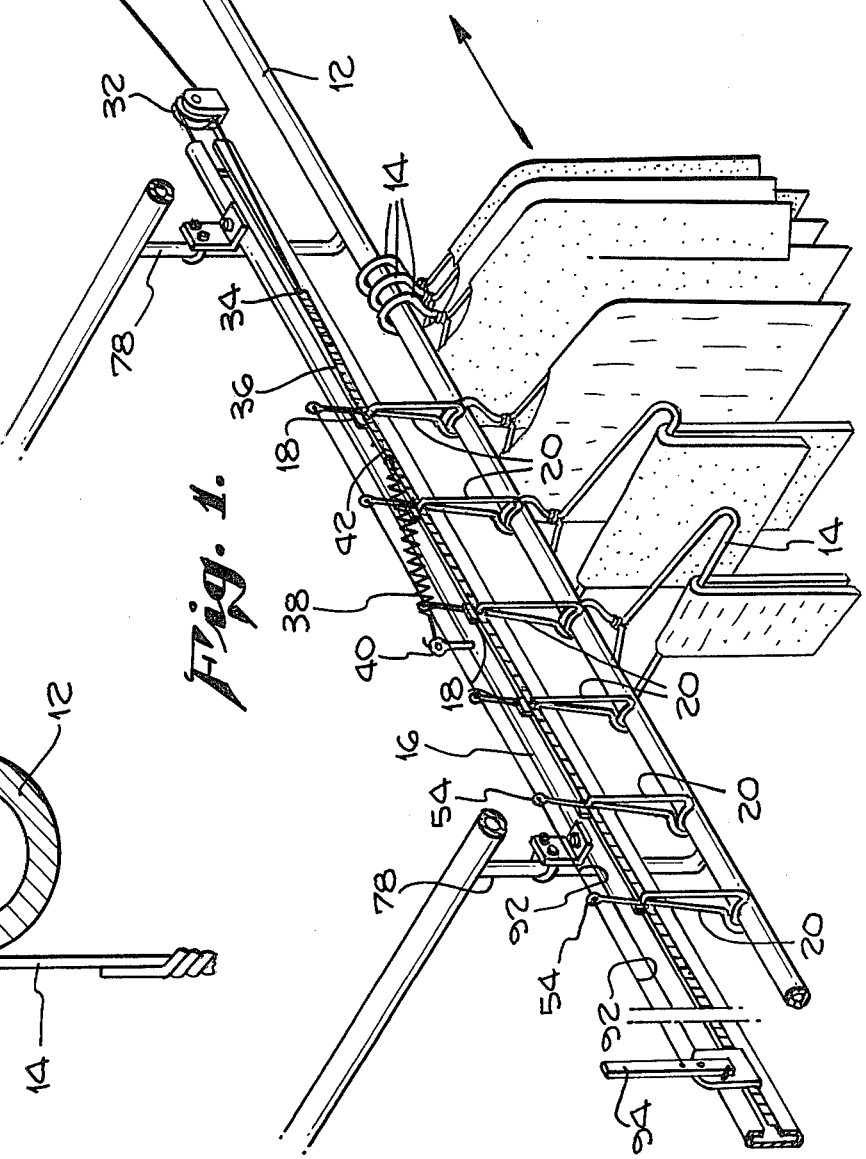

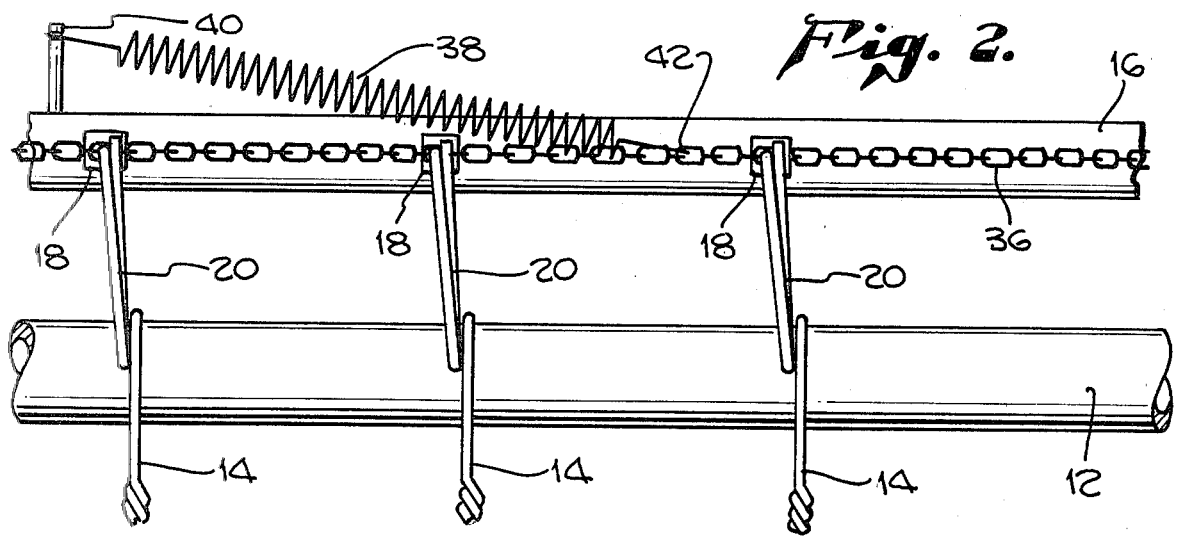
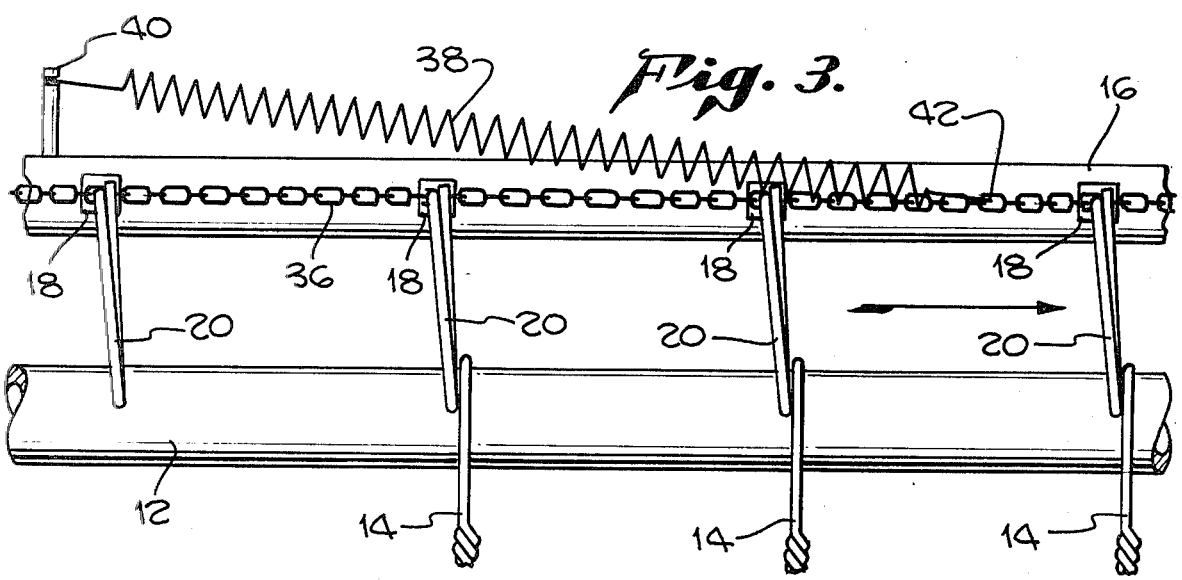
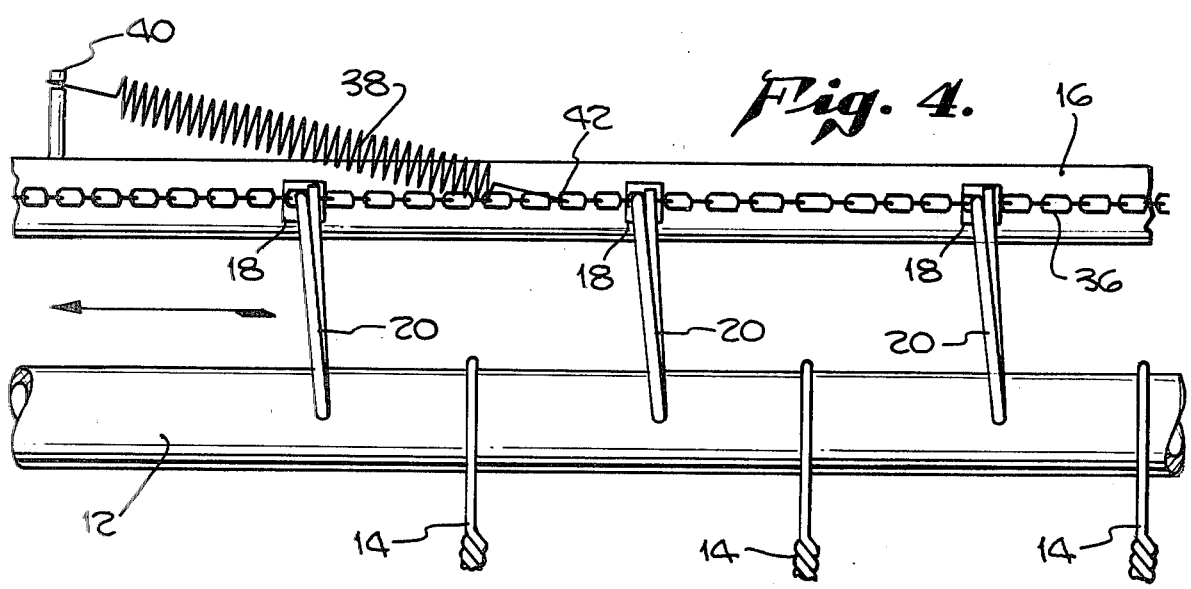

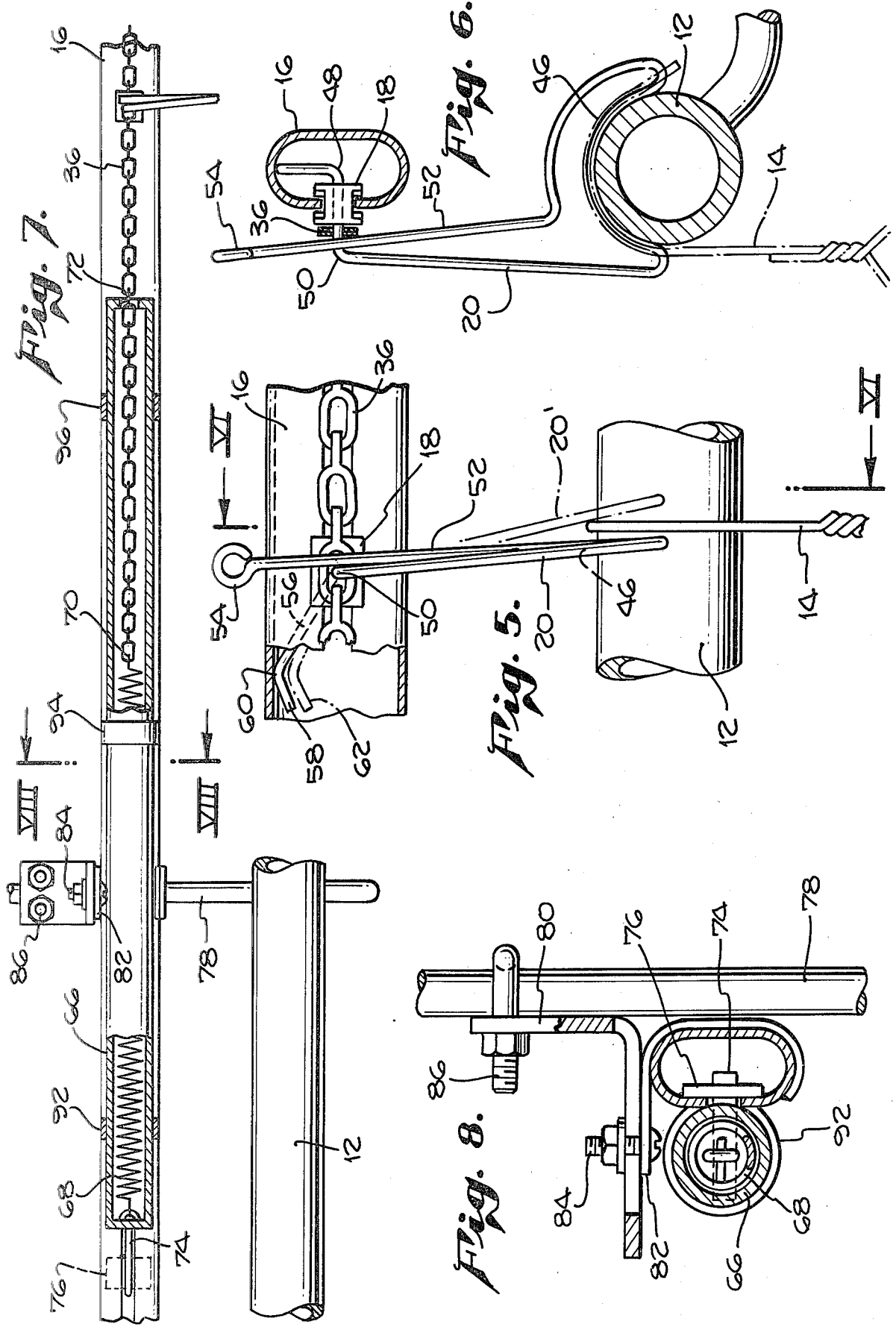

FLEXIBLE CONVEYOR SYSTEM

This is a continuation of application Ser. No. 929,521, filed July 31, 1978, now abandoned.

FIELD OF THE INVENTION

This invention relates to conveyor systems.

BACKGROUND OF THE INVENTION

It has previously been proposed to use a reciprocating mechanism to move clothes hangers along a supporting member, and one disclosure of such an arrangement is included in G. H. Begent, U.S. Pat. No. 2,788,885, granted Apr. 16, 1957. In the Begent patent, depending fingers engage clothes hangers which are supported on a lower member, and the depending fingers are pivotally mounted on a reciprocating cable so that the fingers intermittently move the hangers forward, and then tilt as the cable moves backward to slide over one hanger and to pick up the next successive spaced hanger, being moved along the assembly.

One serious problem with the Begent conveyor is that, once the installation is made, it is no longer possible to use the clothes hanger support for general storage purposes, and in the conduct of a normal commercial business, this is frequently necessary. Thus, when everything is going entirely according to the basic plans, and the clothes which have been dry cleaned are moving along the conveyor in a uniform spaced manner, the system disclosed in the prior patent operates in the intended manner. However, if it is desired to use the clothes support associated with the conveyor for general storage purposes, or if clothes are to be slid in a direction opposite to the normal movement of the conveyor system, this is impossible once the system of the prior patent is installed. In addition, in the event that a hanger or other object should become stuck, or if the conveyor becomes clogged with hangers, the mechanism of Begent could easily be damaged as the depending fingers encounter obstacles.

Accordingly, the principal object of the present invention is to provide a product support arrangement which may be normally employed in its conveyor mode of operation, but which also includes flexibility so that it may be used for general purpose storage and the movement of the product in either direction when the need arises.

SUMMARY OF THE INVENTION

In accordance with the present invention, a system for both the conveyor-type handling of products and also general purpose storing and handling of products along a track includes a rail on which product supporting means or hangers travel, and a set of fingers which are reciprocably moved to cyclically move the product support hangers forward along the rail; and each of the fingers is mounted on a slide, with the slides being reciprocably actuated by fully collapsible tension members extending between the slides.

The fully collapsible nature of the tension members permits all of the slides to be pushed together so that the rail may be used for general purpose storage without interference by the conveyor fingers which are in service when the system is operated as a conveyor.

The slides are mounted in a guide which may be in the form of a slotted tube which extends along the rail. The fingers may be made of wire which extend through a hole in each of the plastic slides. The fully collapsible tension members by which the slides and the fingers are actuated are held in place by the extension of the wires forming the fingers through loops in the tension member (or links of a chain forming the tension member), and the subsequent bending of the wires downward toward the vicinity of the rail. The wire fingers are pivotally mounted in an aperture through each of the plastic slides, and the end of the wire extending through the plastic slider engages the inside of the guide tube to normally prevent rearward pivoting motion of the fingers as they engage the hangers on the rail.

The other end of the wire is bent back upwardly to assist in holding the chain in position, and the end of the wire may also provide a leverage point for camming action when it is desired to inactivate the fingers while they are still in their spaced positions along the length of the rail.

In accordance with another feature of the invention, the chain forming the collapsible tension member is held under tension by an extension spring mounted in a tube located at one end of the guide rail. This tube containing the extension spring is slidably mounted on the guide tube in a manner similar to the slides upon which the fingers are mounted. When it is desired to move the slides or sliders together so that the rail may be used for general purpose storage and product handling, the tube containing the extension spring is unhooked from a restraining pin and moved toward the opposite end of the guide, thereby permitting the collapse of the tension member and pushing all of the slides and hangers together at one end of the rail and guide tube assembly.

The many functions performed by the wire members which act as the fingers for moving the supporting product hangers along the rail are of particular interest. Initially, of course, the fingers perform the function of mechanically engaging the hangers and moving them along the conveyor rail. In addition, one shank portion of the wire which extends through the plastic slider constitutes the pivot for the finger assembly, permitting the fingers to pass over the hangers during reciprocation of the chain. The wire of the fingers also serves to secure the chain to the slider by virtue of both a bend in one piece of the wire which extends through the chain immediately adjacent the slider, and also by the bent-back portion of the other end of the wire which extends past the first end of the wire at the pivot point. In addition, the ends of the wire perform functions which help to control the pivoting or restraint of the fingers in their pivoting action about the pivot point. More specifically, the end of the wire extending through the slider engages the inside of the guide tube to prevent pivoting of the fingers in the rearward direction during normal action of pushing hangers along the rail; and the other end of the wire finger may extend beyond the pivot point and be employed in camming action of the fingers to raise them above the surface of the rail to temporarily disable the conveyor mode of operation when such action is desired for brief periods of time without moving the position of the tube containing the extension spring and the sliders to one end of the unit.

Other objects, features, and advantages of the invention will become apparent from a consideration of the following detailed description and from the drawings.

BRIEF DESCRIPTION OF THE DRAWINGS

FIG. 1 is an overall diagrammatic view of a system illustrating the principles of the present invention;

FIGS. 2, 3, and 4 are views of successive parts of one cycle of operation of the apparatus of FIG. 1;

FIG. 5 is an enlarged side view showing the finger actuation mode of operation of the present apparatus;

FIG. 6 is a partial cross-sectional view taken along lines VI—VI of FIG. 5;

FIG. 7 is a partial cross-sectional view showing a biasing or tensioning spring sub-assembly employed in the present system;

FIG. 8 is a partial cross-sectional view taken along lines VIII—VIII of FIG. 7;

FIG. 9 shows the advancing fingers raised so that they will not move the hangers along the supporting rail;

FIG. 10 is an enlarged view of the slides which are employed to support the wire fingers in the present system; and FIG. 11 is a partial cross-sectional view illustrating the raising of the fingers out of engagement with the slides in accordance with one mode of operation of the present system.

DETAILED DESCRIPTION

With reference to the drawings, FIG. 1 shows the overall mode of operation of the present system, and particularly shows the rail 12 which supports the hangers or other product support elements 14. Above the support rail 12 is a guide 16 in which a series of plastic slides 18 are mounted. Incidentally, the configuration of the plastic slides 18 is shown in FIG. 10 of the drawings which also appears on sheet 1. Pivotally mounted on the plastic slides 18 are a series of wire fingers 20 which serve to intermittently advance the hangers 14 along the conveyor system from left to right as shown in FIG. 1.

The fingers 20 push the hangers 14 along the rail 12 incrementally, in increments of about 5½ inches, which is the spacing between the fingers 20. The fingers are reciprocated back and forth so that they first move the various hangers forward and then slide over the hangers in the opposite direction and go back and pick up the next hanger which is to be moved along the rail 12.

The reciprocating movement of the fingers 20 is accomplished by the motor 22 which drives the arm 24 to which a pulley 26 is attached. A wire 28 has one end connected to a loop 30 mounted on pulley 26, and the other end passes under a pulley 32 at one end of the guide 16, and is secured at point 34 to a chain 36 to which all of the plastic sliders 18 are secured. At the left end of the system of FIG. 1, not shown in this Figure, an extension spring provides force directed to the left, as shown in FIG. 1, to keep the chain 36 under tension between the slides 18, so that they are maintained in their proper relative positions. When the motor 22, with its associated integral speed reducer, rotates the arm 24, the chain 36 and the sliders 18 which are secured to it, are reciprocated along the guide 16, and thereby move the fingers 20 back and forth. By way of specific example, in one successfully operating system, the fingers 20 were spaced approximately 5½ inches apart, and the chain and associated slides and fingers had a longitudinal movement of about 9 inches.

FIGS. 2, 3 and 4 show the mode of operation of the fingers 20 in incrementally advancing the three hangers 14 rightwardly along the rail 12. In FIG. 2, the fingers 20 have started their forward movement to the right and are just in the process of engaging the hangers 14. In FIG. 3, the three hangers 14 have been moved to the right by a distance approximately equal to the spacing between the fingers 20, and the fingers 20 have just about completed their full movement to the right. In FIG. 4 the chain 36, slides 18, and wire fingers 20 have popped over the hangers 14, and are completing their reciprocation stroke to the left. At a portion of the stroke which will immediately follow, they will move to the right and pick up the hangers, as shown in FIG. 2 of the drawings.

Incidentally, the spring 38, which is connected between the post 40 and point 42 toward the right-hand end of the chain 36, exerts a biasing force to the left on the right-hand end of the chain 36. The spring 38 is primarily of use in maintaining the wire 28 in position over the pulleys 26 and 32 when the principal extension spring which is secured to the far left-hand end of chain 36 is released for purposes to be discussed below.

FIG. 5 is an enlarged view of the rail 12 the guide tube 16, the chain 36, and the slide 18. FIG. 6, of course, is taken along lines VI—VI of FIG. 5 and should be viewed in conjunction with FIG. 5. In considering FIGS. 5 and 6, it is interesting to note the many uses which are accomplished by the wire making up the finger 20. First, the lower curved portion 46 serves to engage and push one of the hangers 14 along the rail 12. It may also be noted that the horizontal portion 48 of the wire serves as the pivot point extending through the central hole in the slide 18. Also, the horizontal portion 48 of the wire extends through one of the links of the chain 36, thereby linking the chain to drive the sliders 18 as well as the fingers 20. The sharp bend 50 in the wire tends to retain the chain 36 in position, and the vertically extending portion 52 toward the other end of the wire overlies the chain 36 to firmly retain it in position. Incidentally, the upper end 54 of the vertically extending portion 52 at the other end of the wire, is formed into a loop for actuation in disabling the conveyor action, as described below. The portion of the wire which extends through the slide 18 is bent to the rear in two angled portions 56 and 58 to engage the upper inner surface of the guide tube 16 at point 60 as shown in FIG. 5. Accordingly, when the chain 36 is moved to the right, as shown in FIG. 5, the engagement of the wire at point 60 will oppose clockwise movement of the finger 20 and provide support for its action in pushing the hangers 14 along the rail 12.

When the finger 20 is in the position 20', as indicated by the dashed lines in FIG. 5, it is out of engagement with the pipe 12 or the hangers 14, and the hangers can be moved along the pipe 12, or alternatively, the finger 20 may be moved to the left and ride over the hangers 14 in picking up the next hanger, in the manner described hereinabove in connection with FIGS. 2, 3, and 4.

The position of the end of the wire which is within the guide tube 16, when the finger 20 is in the dashed dot position out of contact with the rail 12, is shown at reference numeral 62.

Incidentally, the relatively loose fit of the slide 18 within the slot in the guide tube 16, together with the resiliency of the wire fingers 20 permits the curved portion 46 of the finger 20 to pop over hangers 14 which may be stuck in place, or possibly blocked from further movement by a pile-up of hangers at the outlet end of the rail 12. This avoids damage to the system under these unusual adverse conditions.

Incidentally, the chain 36 may be of the type made of a simple piece of sheet metal stamped out to form two loops interconnected by a short piece of straight metal, with successive loops being inserted through the previous loop and folded to make the next link of the chain. This type of lightweight chain provides a tension member of fixed length, and one which will also readily collapse and hang down when tension is taken off the chain. It may be noted that the length of the chain between the fingers 20 is approximately equal to twice the extent of the fingers or slightly less than this distance, so that when the slides are moved together as discussed below, the chains will be approximately co-extensive with the length of the fingers.

In the course of describing FIG. 1, it was mentioned that an extension spring would be provided to the left, as shown in FIG. 1 in order to maintain the chain under tension, thereby properly spacing the slides 18, as the right-hand end of chain 36 was reciprocated by the wire 28 under the control of motor 22. The extension spring assembly, including the hollow tube 66 and the inner extension spring 68, which accomplished this purpose are shown in FIGS. 7 and 8 connected to the left-hand end of chain 36 at point 70. It may be noted that the chain 36 extends through an opening 72 at the right-hand end of the tube 66. To secure the tube and its enclosed spring in position, the left-hand end of the cylinder 66 is provided with a hook 74 which extends into the guide tube 16 and engages a vertically extending post or other projections 76 firmly mounted within the guide tube 16.

A vertical supporting column 78 supports the guide tube 16 in the desired location, through the L-shaped bracket 80, the additional strap 82 secured to the guide tube 16, and the screws 84 and 86.

The extension spring assembly including the tube 66 is slidably mounted in the slot in the support tube 16 in a manner similar to the slides 18 by brackets shown schematically at 92, 94, and 96 in FIG. 7, but not otherwise shown. In FIG. 8, the support bracket 92 is not shown for convenience and clarity in the showing of the hook 74 and the post 76 which is engaged by hook 74.

FIG. 9 shows the finger 20 in its raised position with the curved portion 46 rising above the corresponding curved portion of the hanger 14, for example, when the finger 20 is in the dashed dot position 20' as shown in FIG. 5.

FIG. 11 illustrates an optional feature involving the loop 54 which may be employed to shift the finger 20 to the dashed dot position 20' to take it out of the conveyor operation position and out of engagement with the rail 12. As indicated in FIG. 1, the upwardly extending loops 54 of all of the hangers 20 may be interconnected by a wire 92, and this wire may be actuated under the control of a toggle mechanism 94 mounted on a slider in the guide tube 16 and which may be actuated to apply tension to the wires 92 to tilt the fingers 20 to the inactive position.

It is again noted that, when it is desired to use the rail 12 for general storage or product handling purposes, instead of the conveyor mode, the extension spring assembly including the tube 66 is unhooked by releasing hook 74 from the metal stop 76, and sliding the tube to the right in the guide tube 16 until all of the slides 18 abut one another to the far right, as shown in the system drawing of FIG. 1. The slides 18 and the fingers 20 are then in immediate proximity to one another, and the remainder of the rail 20 may be employed as desired for storage purposes or to move the hangers either in one direction or the other.

It is also noted that when the principal extension spring assembly including the cylinder 66 is released and moved to the right, as shown in FIG. 1, the spring 38 comes into play. By applying tension to the chain 36 and the last slider 18, the wire 28 is held in place on the pulleys 26 and 32.

In conclusion, it is to be understood that the above-described preferred implementation is merely illustrative of the principles of the invention. Thus, by way of example and not of limitation, a flexible cable could be employed in place of the disclosed chain as a tension member, and a mechanism other than the motor 22 and crank 24 could be employed to reciprocate the chain 36. Accordingly, the present invention is not to be limited to the specific embodiments shown in the drawings.

What is claimed is:

1. In a fail-safe system for the storing, conveying or general purpose handling of products along a track:
   an elevated and elongated generally horizontal rail;
   supporting means or hangers for products adapted for longitudinal movement along said rail;
   a guide extending generally parallel to and coextensively with said rail;
   a plurality of slide means mounted for movement along said guide;
   a finger pivotally supported on each slide means for limited rotation about a horizontal axis and having a lower portion for abuttingly engaging and moving said supporting means along said rail and an upper extension projecting above said axis;
   a flexible tension element interconnecting the finger extensions;
   selectively actuable toggle means carried by the guide for applying tension to said flexible tension element whereby to raise the finger lower portions out of engagement with the supporting means;
   means including collapsible tension means interconnecting said slide means for reciprocating said fingers to successively move said supporting means an incremental distance along said rail in one direction, and then move said fingers in the opposite direction past the supporting means previously engaged by said fingers and beyond the next supporting means, preparatory to moving the next supporting means along said rail in said one direction in the next cycle of reciprocation of said fingers;
   means movably carried by the guide for applying a biasing force to hold said slide means apart and to hold said tension means fully extended between said slides; and
   selectively releasable means for mounting the biasing means at a selected point in the guide for normal operation, whereby release of the releasable means permits the biasing means to be moved along the guide means, in turn permitting the slide means and fingers to be moved into compact relation, with said tension means fully collapsed, whereby said rail may be employed for general purpose materials handling or storage.

* * * * *